US010397256B2

United States Patent
Kashi et al.

(10) Patent No.: US 10,397,256 B2
(45) Date of Patent: Aug. 27, 2019

(54) SPAM CLASSIFICATION SYSTEM BASED ON NETWORK FLOW DATA

(71) Applicant: Microsoft Technology Licensing, LLC, Redmond, WA (US)

(72) Inventors: Ori Kashi, Seattle, WA (US); Philip Newman, Seattle, WA (US); Daniel Alon, Tel Mon (IL); Elad Yom-Tov, Hoshaya (IL); Hani Neuvirth, Tel Aviv (IL); Royi Ronen, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 15/365,008

(22) Filed: Nov. 30, 2016

(65) Prior Publication Data

US 2017/0359362 A1 Dec. 14, 2017

Related U.S. Application Data

(60) Provisional application No. 62/349,450, filed on Jun. 13, 2016.

(51) Int. Cl.

| H04L 29/06 | (2006.01) |
| H04L 29/06 | (2006.01) |
| G06N 20/00 | (2019.01) |
| G06N 7/00 | (2006.01) |
| H04L 12/58 | (2006.01) |
| H04L 29/08 | (2006.01) |

(52) U.S. Cl.
CPC ......... H04L 63/1425 (2013.01); G06N 7/005 (2013.01); G06N 20/00 (2019.01); (Continued)

(58) Field of Classification Search
CPC ..... H04L 63/1425; H04L 51/12; H04L 67/10; H04L 12/58; H04L 29/06; G06N 7/005; G06N 99/005; G06F 21/56
See application file for complete search history.

(56) References Cited

U.S. PATENT DOCUMENTS

| 8,769,677 B2 | 7/2014 | Vashist et al. |
| 9,143,476 B2 | 9/2015 | Dreller et al. |

(Continued)

FOREIGN PATENT DOCUMENTS

WO 2015100538 A1 7/2015

OTHER PUBLICATIONS

Ehrlich, et al., "Detection of Spam Hosts and Spam Bots Using Network Flow Traffic Modeling", In Proceedings of the 3rd USENIX conference on Large-scale exploits and emergent threats: botnets, spyware, worms, and more, Apr. 27, 2010, 8 pages.

(Continued)

*Primary Examiner* — Edward Zee
*Assistant Examiner* — Ka Shan Choy
(74) *Attorney, Agent, or Firm* — Workman Nydegger

(57) ABSTRACT

In an example embodiment, a computer-implemented method comprises obtaining labels from messages associated with an email service provider, wherein the labels indicate for each message IP how many spam and non-spam messages have been received; obtaining network data features from a cloud service provider; providing the labels and network data features to a machine learning application; generating a prediction model representing an algorithm for determining whether a particular set of network data features are spam or not; applying the prediction model to network data features for an unlabeled message; and generating an output of the prediction model indicating a likelihood that the unlabeled message is spam.

20 Claims, 4 Drawing Sheets

(52) U.S. Cl.
CPC .............. *H04L 51/12* (2013.01); *H04L 67/10* (2013.01); *H04L 51/16* (2013.01)

(56) References Cited

U.S. PATENT DOCUMENTS

| | | | | |
|---|---|---|---|---|
| 2004/0260922 | A1* | 12/2004 | Goodman | G06Q 10/107 713/154 |
| 2007/0185960 | A1* | 8/2007 | Leiba | G06Q 10/107 709/206 |
| 2013/0340089 | A1 | 12/2013 | Steinberg et al. | |
| 2014/0279243 | A1* | 9/2014 | Kukal | G06Q 30/0623 705/26.61 |
| 2014/0372363 | A1* | 12/2014 | Chestnut | G06Q 10/107 706/52 |
| 2015/0074802 | A1* | 3/2015 | Sanjeev | G06F 21/55 726/22 |
| 2015/0128274 | A1 | 5/2015 | Giokas | |
| 2015/0172303 | A1* | 6/2015 | Humble | H04L 63/1408 726/23 |
| 2015/0319182 | A1* | 11/2015 | Natarajan, Sr. | G06F 21/53 726/24 |
| 2015/0326589 | A1* | 11/2015 | Smith | H04L 63/02 726/1 |
| 2016/0142352 | A1 | 5/2016 | Skudlark et al. | |
| 2017/0004303 | A1* | 1/2017 | Yan | G06F 21/56 |
| 2017/0126718 | A1* | 5/2017 | Baradaran | H04L 63/1425 |
| 2017/0257391 | A9* | 9/2017 | Emigh | H04L 63/1441 |
| 2017/0339172 | A1* | 11/2017 | Mahadevia | H04L 63/1416 |

OTHER PUBLICATIONS

Luckner, et al., "Flow—level Spam Modelling using separate data sources", In Proceedings of the Federated Conference on computer Science and Information Systems, Sep. 8, 2013, pp. 91-98.

Sperotto, et al., "An Overview of IP Flow-based Intrusion Detection", In Journal of IEEE Communications Surveys & Tutorials, vol. 12, Issue 3, Jul. 2010, pp. 1-13.

Vilek, Gert, "Detecting spam machines, a Netflow-data based approach", In Master's thesis of University of Twente, Feb. 24, 2009, 64 pages.

Desikan, et al., "Analyzing Network Traffic to Detect E-Mail Spamming Machines", In Proceedings of ICDM Workshop on Privacy and Security Aspects of Data Mining, Nov. 2004, 10 pages.

Luckner, et al., "Reference Data Sets for Spam Detection: Creation, Analysis, Propagation", In International Conference on Hybrid Artificial Intelligence Systems, Sep. 2013, pp. 1-10.

Yen, Ting-Fang, "Detecting Stealthy Malware Using Behavioral Features in Network Traffic", In Thesis of Carnegie Mellon University, Aug. 2011, 123 pages.

Tegeler, et al., "BotFinder: Finding Bots in Network Traffic without Deep Packet Inspection", In Proceedings of the 8th international conference on Emerging networking experiments and technologies, Dec. 10, 2012, pp. 349-360.

Shameem, et al., "Malware Seeker: A Network Intrusion Detection and Correlation Technique against Peer to Peer Botnet", In International Journal of Science and Research, vol. 3, Issue 9, Sep. 2014, pp. 2320-2324.

Leef, et al., "Traffic Classification for Flow Whitelisting", http://www.cs.princeton.edu/~mleef/static/files/whitelisting.pdf, Retrieved on: Oct. 27, 2016, 10 pages.

Zeng, et al., "Detection of Botnets Using Combined Host- and Network-Level Information", In Proceedings of IEEE/IFIP International Conference on Dependable Systems & Networks, Jun. 2010, pp. 1-3.

Sperotto, et al., "Detecting Spam at the Network Level", In Meeting of the European Network of Universities and Companies in Information and Communication Engineering, Sep. 2009, pp. 208-216.

"International Search Report and Written Opinion Issued in PCT Application No. PCT/US2017/036460", dated Oct. 13, 2017, 11 Pages.

* cited by examiner

| Port25 | ExtIPs | | | ExtPorts | | | TCPFlags | | | AUC | TP@(FP=1%) |
| --- | --- | --- | --- | --- | --- | --- | --- | --- | --- | --- | --- |
| | counts | frac | binary | counts | frac | binary | counts | frac | binary | | |
| x | | | | | | | | | | 0.842 +- 0.003 | 0.44 +- 0.03 |
| x | x | x | x | x | x | x | | | | 0.869 +- 0.009 | 0.12 +- 0.05 |
| | x | x | x | x | x | x | | | | 0.869 +- 0.009 | 0.12 +- 0.05 |
| x | | | | x | x | x | | | | 0.887 +- 0.008 | 0.32 +- 0.15 |
| x | x | x | x | | | | | | | 0.856 +- 0.009 | 0.08 +- 0.11 |
| | | | | x | x | x | | | | 0.886 +- 0.008 | 0.31 +- 0.16 |
| | x | x | x | | | | | | | 0.856 +- 0.009 | 0.08 +- 0.12 |
| | | | | x | | | | | | 0.72 +- 0.03 | 0.041 +- 0.003 |
| | | | | | x | | | | | 0.857 +- 0.005 | 0.004 +- 0.001 |
| | | | | | | x | | | | 0.892 +- 0.004 | 0.43 +- 0.02 |
| | | | | | | | x | x | x | 0.845 +- 0.005 | 0.36 +- 0.04 |
| | | | | | | | x | | | 0.843 +- 0.009 | 0.15 +- 0.03 |
| | | | | | | | | x | | 0.813 +- 0.008 | 0.10 +- 0.04 |
| | | | | | | | | | x | 0.805 +- 0.005 | 0.15 +- 0.01 |
| | | | | | | x | x | x | x | 0.899 +- 0.002 | 0.55 +- 0.01 |
| | | | | | | xq | x | x | xq | 0.903 +- 0.001 | 0.56 +- 0.02 |

*FIG. 2*

| Port25 | ExtIPs counts | ExtIPs frac | ExtIPs binary | ExtPorts counts | ExtPorts frac | ExtPorts binary | TCPFlags counts | TCPFlags frac | TCPFlags binary | AUC | TP@(FP=1%) |
|---|---|---|---|---|---|---|---|---|---|---|---|
| x | | | | | | | | | | 0.929 +- 0.004 | 0.55 +- 0.02 |
| | x | x | x | | | | | | | 0.951 +- 0.002 | 0.79 +- 0.02 |
| | x | | | | | | | | | 0.951 +- 0.002 | 0.79 +- 0.02 |
| | | x | | | | | | | | 0.950 +- 0.004 | 0.80 +- 0.03 |
| | | | x | | | | | | | 0.951 +- 0.004 | 0.792 +- 0.007 |
| | | | | x | x | x | | | | 0.94 +- 0.003 | 0.58 +- 0.16 |
| | | | | x | | | | | | 0.943 +- 0.003 | 0.61 +- 0.12 |
| | | | | | x | | | | | 0.938 +- 0.002 | 0.63 +- 0.03 |
| | | | | | | x | | | | 0.896 +- 0.003 | 0.41 +- 0.12 |
| | | | | | | | x | x | x | 0.913 +- 0.003 | 0.68 +- 0.02 |
| | | | | | | | x | | | 0.910 +- 0.004 | 0.57 +- 0.05 |
| | | | | | | | | x | | 0.910 +- 0.003 | 0.65 +- 0.04 |
| | | | | | | | | | x | 0.849 +- 0.008 | 0.14 +- 0.08 |
| x | | | x | | | | | | | 0.952 +- 0.002 | 0.806 +- 0.006 |
| x | | | | | x | | | | | 0.944 +- 0.004 | 0.54 +- 0.099 |
| x | | | | x | x | x | | | | 0.944 +- 0.002 | 0.75 +- 0.01 |
| | | x | | x | | | | | | 0.949 +- 0.003 | 0.77 +- 0.02 |
| | | x | | | | | x | x | x | 0.952 +- 0.002 | 0.81 +- 0.02 |
| | | x | | | | | x | x | x | 0.948 +- 0.003 | 0.75 +- 0.02 |
| | | | x | | x | | x | x | x | 0.952 +- 0.003 | 0.80 +- 0.02 |

*FIG. 3*

SPAM CLASSIFICATION SYSTEM BASED ON NETWORK FLOW DATA

CROSS-REFERENCE TO RELATED APPLICATIONS

This application claims the benefit of the filing date of U.S. Provisional Patent Application No. 62/349,450, which is titled "Spam Classification System Based on Network Flow Data" and was filed Jun. 13, 2016, the disclosure of which is hereby incorporated by reference herein in its entirety.

BACKGROUND

Electronic messaging, and particularly electronic mail (email), is increasingly used as a means for disseminating unwanted advertisements and promotions (often denoted as "spam") to network users. Email can also be misused in malicious attacks, such sending a large volume of email to an address in a denial-of-service attack, and in attempts to acquire sensitive information in phishing attacks.

Common techniques utilized to thwart spam and malicious emails involve the employment of filtering systems. In one filtering technique, data is extracted from the content of two classes of example messages (e.g., spam and non-spam messages), and a filter is applied to discriminate probabilistically between the two classes, such types of filters are commonly referred to as "content-based filters." These types of machine learning filters usually employ exact match techniques to detect and distinguish spam messages from good messages.

Spammers and malicious email creators can fool conventional content-based filters by modifying their spam messages to look like good messages or to include a variety of erroneous characters throughout the message to avoid and/or confuse character recognition systems. Thus, such conventional filters provide limited protection against spam and malicious messages.

In other techniques, a Domain Name System (DNS) blackhole list (DNSBL) or a real-time blackhole list (RBL) may be referenced to identify IP addresses that are reputed to send electronic mail spam. Email servers can be configured to reject or flag messages that are sent from a site listed on these lists. Unfortunately, these lists may block legitimate emails along with spam that is sent from shared email servers, and it can be difficult to remove legitimate addresses from the lists.

SUMMARY

This Summary is provided to introduce a selection of concepts in a simplified form that are further described below in the Detailed Description. This Summary is not intended to identify key elements or essential elements of the claimed subject matter, nor is it intended to be used to limit the scope of the claimed subject matter.

Detecting spam solely from network metadata is a difficult task, since the contents of the communications are not available. Email service providers have already detected spam messages based on email content, and IPFIX data from a large number of virtual machines is available in a cloud service network. Using the email service providers' spam observations and cloud-network IPFIX data as inputs to a machine learning classifier, a spam-classifying estimator or algorithm can be created by training on generic network metadata features, such as external IPs addressed, external ports addressed, TCP flags observed, protocols observed, etc. This training can reveal hidden patterns that are associated with spam email, and can dynamically adapt for changes in the communication patters of spamming machines.

DRAWINGS

To further clarify the above and other advantages and elements of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail using the accompanying drawings in which:

FIG. 2 is a table that summarizes the results of the various models and feature groups for an example implementation with a logistic regression model.

FIG. 3 is a table that summarizes the results of the various models and feature groups for an example implementation with a Gradient Boosted trees model.

DETAILED DESCRIPTION

Figure 1:
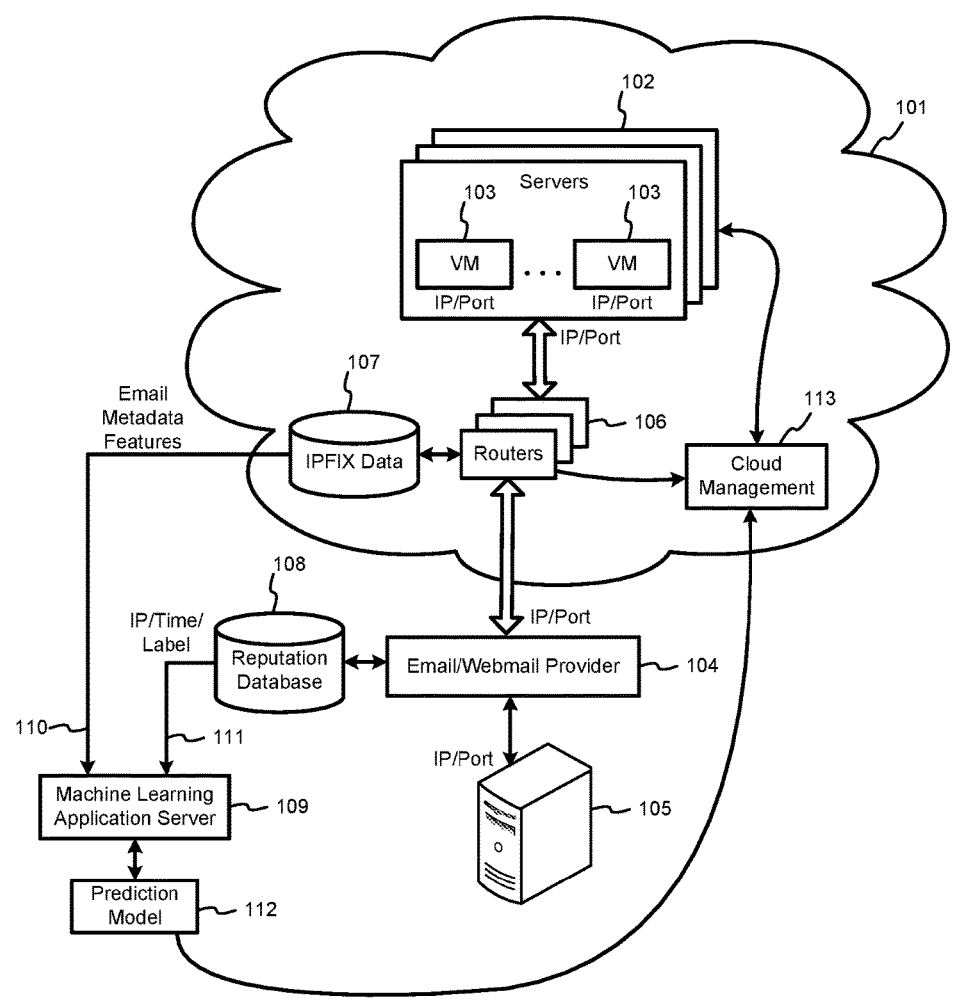
FIG. 1 is a high-level block diagram of a system implementing an example embodiment of a spam classification system for the cloud based on large scale feature extraction from network flow data.

The accelerated growth in the adoption of cloud computing has given rise to security as both a challenge and an opportunity. Cloud service providers can have unique insights into the threat landscape and can use a wide variety of data sources and technologies to help customers prevent, detect, and respond to threats.

To provide global security for cloud service tenants, it is important for service providers to provide basic security protection to all the customers, including those customers that do not fully acknowledge the importance of security. This allows the service provider to exclude simple attackers, who are searching for general network vulnerabilities rather than performing a targeted attack.

A general protection layer can be achieved through the analysis of network flow data that is commonly collected over networks. This is possible due to the low marginal cost of this data, which requires no additional storage and no additional compute costs to the user. In a cloud system, packets of network traffic may be sampled and collected in a protocol format called Internet Protocol Flow Information Export (IPFIX). This data contains high-level descriptors of the connections, such as the source and destination IP addresses and ports, protocol types, and union of the TCP flags, but not the actual packets transferred.

This data is widely available for all network communication going in and out of a cloud service network and for all customer subscriptions on the cloud service. However, the available information might be too limited for many applications, such as spam detection, where the content of the communication holds the key information as to whether this communication is malicious or benign. For example, observing large amount of communication to port 25 (SMTP) might indicate a malicious spamming activity, but it may also reflect a valid newsletter system.

The amount of communication to external IP addresses on port 25 as determined from sampled IPFIX data can be used when trying to identify spam email sent from a cloud. Other features can represent the network activity pattern; however, this can also be affected by the various offers of the specific cloud, and thus would be best utilized when labels are available from an email service provider.

Providers of Internet services have a significant advantage in obtaining various signals and labels with which the network analysis can be trained. For example, an email or webmail service provider may have access to the content of email messages if customers have opted in to allow such access and if other privacy concerns are addressed. This makes it possible for the email service provider to accurately distinguish between spam and non-spam messages and to label packets accordingly.

Utilizing information from these additional sources can enhance predictions on the network flow data by applying a machine learning analysis. This analysis allows a cloud service provider to detect compromised machines on the cloud service network, for example. In an example scenario, spam labels collected from email may be used to detect spam sending virtual machines (VMs) or other spamming hosts in the cloud service network.

A reputation dataset comprising labels can be generated from emails originating from the cloud service network, wherein the labels are provided for each IP address on the cloud service network and indicate the number of spam and non-spam messages received from each address. To curate these labels, all IP addresses and associated data for which ten or less messages were received may be discarded from the dataset. The final dataset preferably contains a large volume of samples that are designated as positive (i.e., spam) or negative.

The large volume of labels allows for taking a generic feature generation approach. A sparse features matrix may be extracted similar to a bag-of-words approach. The matrix represents for each deployment on a certain date the histograms, normalized histogram, and binary existence representation for each of the external IP addresses and ports to which it reached as well as the TCP flags used. This generic approach yields an important advantage since it allows the system to dynamically adapt for new attacking schemes that may rise, thus extending the life expectancy of the system.

Machine learning software, such as Vowpal Wabbit with a logistic loss and quadratic feature extraction, may be used to explore the contribution of the various feature combinations in the sparse features matrix. Different combinations of least absolute deviations (L1) and least square errors (L2) loss functions, as well as different weights for the positive and negative classes may be used by the machine learning software. These models may be compared to a baseline model that is trained on the same labels using two knowledge-based features: the total amount of communication to port 25 (SMTP), and the fraction of this communication out of all the deployment activity. It will be understood by those of skill in the art that any machine learning software now known or later developed may be used, such as a gradient boosted trees model or improved deep learning approaches.

FIG. 1 is a high-level block diagram of a system implementing an example embodiment of a spam classification system for the cloud based on large scale feature extraction from network flow data. A cloud service provider hosts tenants/customers on cloud services network or distributed computing system 101. The cloud services network 101 comprises many servers 102 each hosting multiple virtual machines (VMs) 103. Servers 102 may also host databases, web pages, or other applications. VMs 103 may send email using an email or webmail provider 104 to a destination server or computer 105. Messages sent to and from VMs 103 and servers 102 are routed through cloud services network 101 via routers 106 to an IP address and port on server 105.

The messages routed through cloud services network 101 comprise metadata, such as the IP address and port associated with an originating or destination VM or server, TCP flags, etc. The cloud service provider may collect flow-based metadata by looking at packets passing through routers 106 or at other observation points and condensing the packet information into flow records, such as in IPFIX file format, that capture information about the packets. This information may be stored by the cloud service provider, such as in IPFIX database 107.

One or more VMs 103 may be sending spam email. This may happen because the VM was configured to do so by the associated tenant or because a virus/malware is running on the VM without the tenant's knowledge. Such use of VMs 103 to send spam typically violates the cloud service provider's terms of service. However, for privacy and security reasons, the cloud service provider usually does not or cannot inspect the packet content or the payload of the email that is being routed to/from each VM 103 and, therefore, cannot perform traditional content-based spam identification.

Email/webmail providers 104 often have multiple ways to identify spam that is sent by and to its customers' accounts, such as by inspecting email content (if, for example, opted-in by the customer or allowed by the terms of service), by applying algorithms, etc. This allows the email/webmail provider to identify customers' emails as spam or not spam. Such information may be stored in a reputation database 108 or other storage. If the email/webmail provider 104 identifies a specific VM 103 as the source of spam email, then it may notify the cloud service provider. It would be preferable if the cloud service provider could identify spam email from network data without having to access message content. Moreover, it would be better if the cloud provider could detect all outgoing spam from the network and not just the fraction that reaches a webmail provider.

Machine learning can be used to determine a likelihood that a particular set of network data is spam or not. A machine learning application running on server 109 receives a set of email metadata features 110 from IPFIX database 107. These features may include, for example, destination and/or source IP addresses, destination and/or source ports, number of messages, number of flows, TCP flags, etc. The machine learning application also receives data from the email/webmail provider reputation database 108, such as a list of IP addresses, times, and labels for many messages, wherein the labels correspond to a verdict of whether individual messages were identified as spam or not spam. The reputation database data should include a network imprint comprising both positive (i.e., spam) and negative (i.e., not spam) data for training. The machine learning application correlates the IP addresses between both datasets and builds a prediction model 112 comprising an algorithm that predicts whether a given set of network IPFIX data is spam or not. The prediction model 112 may be generated from a sample of network traffic and does not require all network traffic to be analyzed.

The prediction model 112 may be provided to the cloud service provider via cloud management portal 113, for example. The cloud service provider may then apply the prediction model to the network data from future email messages, such as network data collected from the routers 106. The prediction model allows the cloud service provider to identify potential spam without having to access message content. When a VM 103 is identified as sending spam, the cloud service provider may notify or warn the VM customer or tenant. Alternatively, the cloud service provider may isolate or shutdown the spamming VM 103.

The system may further allow for automatically retraining the models. This would allow for the prediction model to automatically adapt for new network patterns associated with spam. For example, the reputation database 108 may be updated and changed over time as new sources of spam email are identified. Machine learning application server 109 may use the updated IP/time/label data from the reputation database 108 to create a new or updated prediction model 112.

FIG. 2 is a table that summarizes the results of the various models and feature groups for an example implementation using a logistic regression model. FIG. 3 is a table that summarizes the results of the various models and feature groups for an example implementation using a Gradient Boosted trees model. The tables in FIGS. 2 and 3 illustrate performance evaluation on various feature groups using 5-fold cross validation (mean±std). The features comprise port 25, external IP addresses, external ports, and TCP flags, including the count, fraction (frac) of the messages sent over port 25, and binary port-numbers for each. The table lists the area under curve (AUC) evaluation metric. Each row illustrates the AUC and true positive (TP) for a selected set of features (x) in a logistic regression model. The machine learning model is used only on VMs from which outgoing communication to port 25 is observed. This is to reduce the bias between the training set and the test set, which could reduce performance.

For the logistic regression model results illustrated in FIG. 2, the best model observed in evaluation was using the all TCP flags feature, with the binary port-numbers features, together with the quadratic products (xq) of the binary features. The baseline model reached a true positive rate of 44% at a false positive (FP) rate or 1%, while the improved model reached a true positive rate of 56% at the same false positive rate. Alternatively, in the Gradient boosted trees model, the best model observed used the same TCP flags features with a binary feature of the external IP addresses.

For the Gradient Boosted trees model results illustrated in FIG. 3, all features that appeared for ten samples or less were filtered out, and then TLC was used with a Gradient Boosted Trees algorithm in its default configuration to explore the contribution of the various feature combinations. These models were compared to a baseline model trained on the same labels using the two knowledge-based features: the total amount of communication to port 25 (SMTP), and the fraction of this communication out of all the deployment activity. Due to the small number of features in this model, it was trained with 20 trees instead of 100.

FIG. 3 lists the various feature combinations explored. Each set of independent features (IP addresses, ports, TCP flags) was first explored independently, and then the best option was combined with the rest of the features. The best model was using all TCP flags features, with the binary external IP address features. The baseline model reached a true positive (TP) rate of 55% at a false positive (FP) rate or 1%, while the improved model reached a TP rate of 81% at the same FP rate.

IPFIX data, with its generic availability, is highly valuable for providing a basic security tier to tenants of a cloud service network. However, its content is very limited, and might result in inaccurate predictions in cases where the key information of an attack resides in the content of the communication, rather than a concise network pattern. As noted herein, data sharing between different services can add valuable information to help identify less evident network patterns.

Detecting spam from network IPFIX data is a difficult task, since the actual content of the communication is not available. Spam email may already be detected by mail service providers based on the mail content. IPFIX data from many virtual machines (VMs) is available in the cloud service network. Using these sizable detections as a feature source for a classifier, which uses the IPFIX data as input, allows for training on generic features, such as, for example, all external ports addressed, all TCP flags observed, etc. This can reveal hidden patterns that are associated with spam and other malicious email and can dynamically adapt for changes in the communication patters of spamming machines.

For each data type (i.e., external IP addresses, external port numbers, TCP flags, protocols), a sparse matrix is extracted containing the following:
flow counts of each value (could also be sample counts),
binary value (i.e., 1 if exists),
fraction of counts out of all the communication of the virtual machine.

Labels may be obtained from a service provider's email or webmail service, wherein the labels indicate for each IP how many spam and non-spam messages have been received. All IP addresses with less than a minimum number of messages (e.g., less than ten messages) may be filtered. For the remaining, if any of the messages was spam, the virtual machine associated with this IP is labeled as spamming. These features and labels may be fed into a classification algorithm (such as, for example, Vowpal Wabbit using a logistic loss, possibly with L1 and L2 regularization on the weights, Gradient Boosted Trees, etc.), and the trained learner is used to predict spam from IPFIX data.

Figure 4:
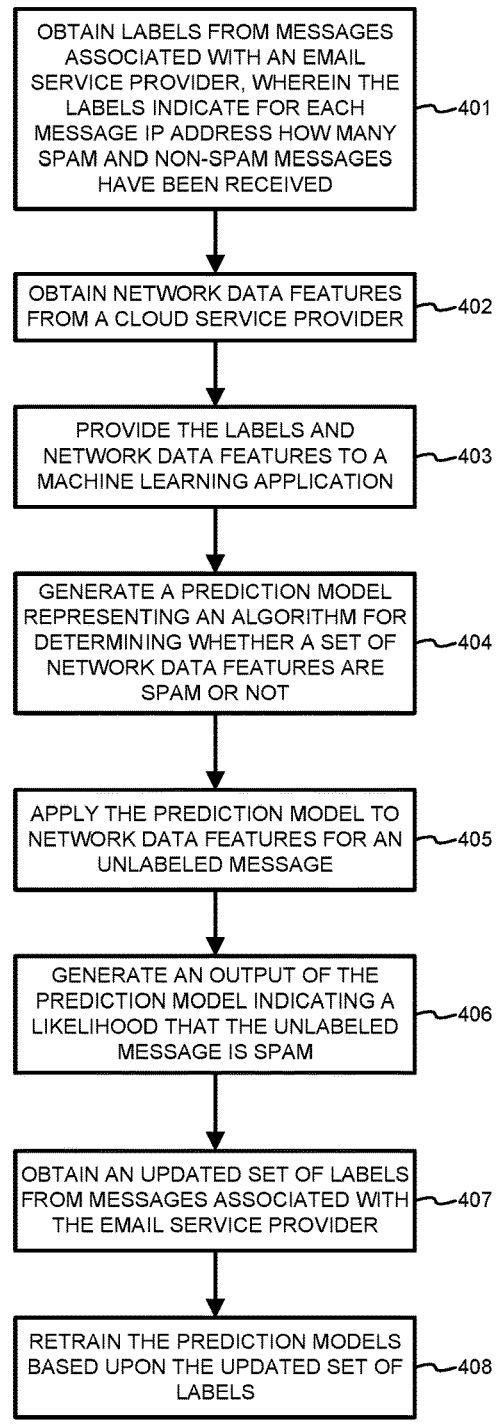
FIG. 4 is a flowchart illustrating the steps of an example computer-implemented method for classifying spam messages.

FIG. 4 is a flowchart illustrating the steps of an example computer-implemented method for classifying spam messages. In step 401, labels from messages associated with an email service provider are obtained. The labels indicate for each message IP address how many spam and non-spam messages have been received. In step 402, network data features from a cloud service provider are obtained. The network data features may correspond to IPFIX data or may comprise email metadata.

In step 403, the labels and network data features are provided to a machine learning application. The machine learning application may be, for example, a trained learner having a classification algorithm that is used to predict spam from a sparse matrix created from the network data features. In step 404, a prediction model is generated to represent an algorithm for determining whether a set of network data features are spam or not.

In step 405, the prediction model is applied to network data features for an unlabeled message. In step 406, an output of the prediction model is generated to indicate a likelihood that the unlabeled message is spam. If any of the unlabeled messages are identified as spam, then the virtual machine associated with that message's IP address may be labeled as spamming.

In step 407, an updated set of labels are obtained from messages associated with the email service provider. In step 408, the prediction models is retrained based upon the updated set of labels.

An example computer-implemented method comprises obtaining labels from messages associated with an email service provider, wherein the labels indicate for each message IP address how many spam and non-spam messages have been received, obtaining network data features from a cloud service provider, providing the labels and network data features to a machine learning application, and generating a prediction model representing an algorithm for determining whether a particular set of network data features are spam or not.

In other embodiments, the computer-implemented method further comprises applying the prediction model to network data features for an unlabeled message, and generating an output of the prediction model indicating a likelihood that the unlabeled message is spam.

In other embodiments, the computer-implemented method further comprises obtaining an updated set of labels from messages associated with the email service provider, and retraining the prediction models based upon the updated set of labels.

In other embodiments, if any of the unlabeled messages are identified as spam, the computer-implemented method further comprises labeling the virtual machine associated with that message's IP address as spamming.

In other embodiments of the method, the machine learning application is a trained learner having a classification algorithm that is used to predict spam from a sparse matrix created from the network data features.

In other embodiments of the method, the network data features correspond to IPFIX data.

In other embodiments of the method, the network data features comprise email metadata.

In other embodiments of the method, the labels from messages associated with an email service provider are stored as a reputation dataset.

An example machine-learning server comprises one or more processors, and one or more computer-readable storage media having stored thereon computer-executable instructions that, when executed by the one or more processors, cause the processors to obtain labels from messages associated with an email service provider, wherein the labels indicate for each message IP address how many spam and non-spam messages have been received, obtain network data features from a cloud service provider, provide the labels and network data features to a machine learning application, and generate a prediction model representing an algorithm for determining whether a particular set of network data features are spam or not.

In additional embodiments, the server further comprises computer-executable instructions that further cause the processors to apply the prediction model to network data features for an unlabeled message, and generate an output of the prediction model indicating a likelihood that the unlabeled message is spam.

In additional embodiments, the server further comprises computer-executable instructions that further cause the processors to obtain an updated set of labels from messages associated with the email service provider, and retrain the prediction models based upon the updated set of labels.

In additional embodiments, the server further comprises computer-executable instructions that further cause the processors to forward the prediction model to a cloud management application for use in identifying spamming machines on a cloud service.

In additional embodiments, the machine learning application is a trained learner having a classification algorithm that is used to predict spam from a sparse matrix created from the network data features.

In additional embodiments, the network data features correspond to IPFIX data.

In additional embodiments, the network data features comprise email metadata.

In additional embodiments, the labels from messages associated with an email service provider are stored as a reputation dataset.

An further example method comprises receiving a prediction model representing an algorithm for determining whether a particular set of network data features are spam or not, wherein the prediction model is generated from labels from messages associated with an email service provider and from network data features from a cloud service provider, applying the prediction model to network data features for an unlabeled message, and generating an output of the prediction model indicating a likelihood that the unlabeled message is spam.

In other embodiments of the method, the labels indicate for each message IP address how many spam and non-spam messages have been received.

In other embodiments of the method, the prediction model is generated by a machine learning application based upon the labels from messages associated with the email service provider and the network data features from the cloud service provider.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for sharing data between at least an email service provider and a cloud service provider in order to identify network spamming message patterns without accessing spamming message content, the method comprising:
   obtaining labels from messages associated with an email service provider, wherein the labels indicate for each message IP address how many spam and non-spam messages have been received;
   obtaining network data features from a cloud service provider;
   providing the labels and the network data features to a machine learning application, wherein the machine learning application identifies correlations between IP addresses associated with the labels and IP addresses associated with the network data features, the correlations being used to facilitate the machine learning application in generating a prediction model to detect spamming hosts that generate spamming messages;
   generating the prediction model representing an algorithm for determining whether a particular set of network data features are spam or not; and
   after an unlabeled message, which has not yet been characterized as spam or not as spam, is generated by a computing device of the cloud service provider and after the unlabeled message is received at a router of the cloud service provider in preparation for transmittal to a recipient computing device, applying the prediction model to the unlabeled message to determine whether the unlabeled message is spam or is not spam,
   wherein the network data features from the cloud service provider include descriptors of connections between the computing device that generated the unlabeled message and the recipient computing device, the descriptors including information describing a source and destination IP address, source and destination ports, a protocol type, and a union of TCP flags.

2. The computer-implemented method of claim 1, further comprising:
generating an output of the prediction model indicating a likelihood that the unlabeled message is spam.

3. The computer-implemented method of claim 1, further comprising:
obtain an updated set of labels from messages associated with the email service provider; and
retrain the prediction models based upon the updated set of labels.

4. The computer-implemented method of claim 1, wherein a virtual machine residing on the computing device generated the unlabeled message, and wherein the method further comprises:
when the unlabeled message is identified as being spam, labeling the virtual machine as spamming.

5. The computer-implemented method of claim 1, wherein the machine learning application is a trained learner having a classification algorithm that is used to predict spam from a sparse matrix created from the network data features.

6. The computer-implemented method of claim 1, wherein the network data features correspond to IPFIX data.

7. The computer-implemented method of claim 1, wherein the network data features comprise email metadata.

8. The computer-implemented method of claim 1, wherein the labels from messages associated with an email service provider are stored as a reputation dataset.

9. A machine-learning server comprising:
one or more processor(s); and
one or more computer-readable hardware storage device(s) having stored thereon computer-executable instructions that are executable by the one or more processor(s) to cause the machine-learning server to:
obtain labels from messages associated with an email service provider, wherein the labels indicate for each message IP address how many spam and non-spam messages have been received;
obtain network data features from a cloud service provider;
provide the labels and the network data features to a machine learning application, wherein the machine learning application identifies correlations between IP addresses associated with the labels and IP addresses associated with the network data features, the correlations being used to facilitate the machine learning application in generating a prediction model to detect spamming hosts that generate spamming messages;
generate the prediction model representing an algorithm for determining whether a particular set of network data features are spam or not; and
after an unlabeled message, which has not yet been characterized as spam or not as spam, is generated by a computing device of the cloud service provider and after the unlabeled message is received at a router of the cloud service provider in preparation for transmittal to a recipient computing device, apply the prediction model to the unlabeled message to determine whether the unlabeled message is spam or is not spam,
wherein the network data features from the cloud service provider include descriptors of connections between the computing device that generated the unlabeled message and the recipient computing device, the descriptors including information describing a source and destination IP address, source and destination ports, a protocol type, and a union of TCP flags.

10. The machine-learning server of claim 9, wherein execution of the computer-executable instructions further causes the machine-learning server to:
generate an output of the prediction model indicating a likelihood that the unlabeled message is spam.

11. The machine-learning server of claim 9, wherein execution of the computer-executable instructions further causes the machine-learning server to:
obtain an updated set of labels from messages associated with the email service provider; and
retrain the prediction models based upon the updated set of labels.

12. The machine-learning server of claim 9, wherein execution of the computer-executable instructions further causes the machine-learning server to:
forward the prediction model to a cloud management application for use in identifying spamming machines on a cloud service.

13. The machine-learning server of claim 9, wherein the machine learning application is a trained learner having a classification algorithm that is used to predict spam from a sparse matrix created from the network data features.

14. The machine-learning server of claim 9, wherein the network data features correspond to IPFIX data.

15. The machine-learning server of claim 9, wherein the network data features comprise email metadata.

16. The machine-learning server of claim 9, wherein the labels from the messages associated with the email service provider are stored as a reputation dataset.

17. The machine-learning server of claim 9, wherein the descriptors are included as flow-based metadata.

18. The machine-learning server of claim 9, wherein the descriptors are included as flow-based metadata, and wherein execution of the computer-executable instructions further causes the machine-learning server to:
condense the flow-based metadata into flow records that capture data about the messages.

19. A computer-implemented method for sharing data between different services to identify network spamming patterns, the method comprising:
receiving a prediction model representing an algorithm for determining whether a particular set of network data features are spam or not, wherein:
the prediction model is generated from labels from messages associated with an email service provider and from network data features from a cloud service provider,
the prediction model is generated by a machine learning application that identifies correlations between IP addresses associated with the labels and IP addresses associated with the network data features, and
the correlations facilitate the machine learning application in generating the prediction model to detect spamming hosts that generate spamming messages;
after an unlabeled message, which has not yet been characterized as spam or not as spam, is generated by a computing device of the cloud service provider and after the unlabeled message is received at a router of the cloud service provider in preparation for transmittal to a recipient computing device, applying the prediction model to network data features of the unlabeled message to determine whether the unlabeled message is spam or is not spam; and generating an output of the prediction model indicating a likelihood that the unlabeled message is spam, wherein the network data features from the cloud service provider include descriptors of connections between the computing device that generated the unlabeled message and the recipient computing device, the descriptors including information describing a source and destination IP address, source and destination ports, a protocol type, and a union of TCP flags.

20. The computer-implemented method of claim 19, wherein the labels indicate for each message IP address how many spam and non-spam messages have been received.

* * * * *